United States Patent

Adams

(10) Patent No.: US 12,198,564 B1
(45) Date of Patent: Jan. 14, 2025

(54) SECURE GROUND-BASED DETECTION AND ALERT SYSTEM AND METHOD

(71) Applicant: Raymond Adams, Allendale, NJ (US)

(72) Inventor: Raymond Adams, Allendale, NJ (US)

(*) Notice: Subject to any disclaimer, the term of this patent is extended or adjusted under 35 U.S.C. 154(b) by 0 days.

(21) Appl. No.: 18/830,772

(22) Filed: Sep. 11, 2024

(51) Int. Cl.
G08G 5/04 (2006.01)
G01S 13/933 (2020.01)
G08G 5/00 (2006.01)

(52) U.S. Cl.
CPC ............ *G08G 5/045* (2013.01); *G01S 13/933* (2020.01); *G08G 5/0043* (2013.01)

(58) Field of Classification Search
USPC ....... 340/961, 963, 973, 959, 964, 981, 994, 340/995.13, 426.22, 691.6
See application file for complete search history.

(56) References Cited

U.S. PATENT DOCUMENTS

| | | | |
|---|---|---|---|
| 9,417,325 B1* | 8/2016 | Bry ...................... | G08G 5/0013 |
| 2011/0160941 A1* | 6/2011 | Garrec .................. | G01S 13/953 |
| | | | 701/17 |
| 2020/0026272 A1* | 1/2020 | Castet ................ | A61B 5/14546 |
| 2022/0035367 A1* | 2/2022 | Ho ....................... | G08G 5/0043 |
| 2022/0262265 A1* | 8/2022 | Kashima .............. | G08G 5/0039 |

OTHER PUBLICATIONS

13.—Federal Aviation Administration, Urban Air Mobility (UAM) Version 2.0, Concept of Operations Apr. 26, 2023.
14.—US Naval Air Warfare Center to acquire Guardian ground-based UAS detect and avoid systems—Unmanned airspace, https://www.unmannedairspace.info/latest-news-and-information/11392/, Mar. 15, 2021.
15.—Federal Aviation Administration, Unmanned Aircraft System (UAS) Traffic Management (UTM), Concept of Operations, v2.0, Mar. 2, 2020.
16.—Sherri Magyarits, Extensible Traffic Management (xTM), Presented to: REDAC NAS Operations Subcommittee, Mar. 15, 2022.
18.—Richard Alligier et al., Efficient Conflict Detection for Conflict Resolution, https://enac.hal.science/hal-01859904, Aug. 22, 2018.
Mary Ottman, Army Ground Based Sense and Avoid (GBSAA), https://www.army.mil/article/80681/army_ground_based_sense_and_avoid_gbsaa_enables_unmanned_aircraft_flight_in_the_national_airspace , May 29, 2012.
Ewen Denney et al., Assuring Ground-Based Detect and Avoid for Uas Operations, 33rd IEEE/AIAA Digital Avionics Systems Conference (2014).

(Continued)

*Primary Examiner* — Daniel Previl
(74) *Attorney, Agent, or Firm* — Mandelbaum Barrett PC; Lawrence B. Goodwin

(57) ABSTRACT

A system and method that detect potential collision conflicts involving uncrewed aircraft systems and generate alerts of such potential conflicts. The invention integrates existing radar systems from the Federal Aviation Administration (FAA) and the Department of Defense (DOD) within a secure federal facility. This integration facilitates the provision of both raw and supplemental data to autonomous or remotely piloted aircraft. The system and method assist in conflict detection and provide alerts in a standardized format that can be used by the aircraft's operator while preserving the confidentiality of sensitive flight data.

20 Claims, 2 Drawing Sheets

(56) References Cited

OTHER PUBLICATIONS

U.S. Department of Transportation, GBDAA Helps Safely Integrate Drones into the National Airspace System, https://www.volpe.dot.gov/news/gbdaa-helps-safely-integrate-drones-national-airspace-system, Mar. 10, 2020.
SRC, Inc., Ground-Based Sense & Avoid (GBSAA) Radar System, https://www.srcinc.com/products/radar/gbsaa-radar-system.html, 2024.
Federal Aviation Administration, NAS Defense Programs, https://www.faa.gov/about/office_org/headquarters_offices/ato/service_units/techops/ndp 1/2, Jan. 11, 2023.
Scott Scheff, HF Designworks, Inc., State of the Industry: UAS Sensor Review, National Aeronautics and Space Administration, NASA/CR-20210026446, Sep. 2021.
HF Designworks, Inc., Ground Based Detect & Avoid, Final Report Presentation, Dec. 2018.
Brigantine Surveillance Gateway Processor (SGP) Product Sheet | PS035 2.0 2021.11 | © 2021 Sunhillo Corporation.

\* cited by examiner

SECURE GROUND-BASED DETECTION AND ALERT SYSTEM AND METHOD

BACKGROUND OF THE INVENTION

The integration of remotely piloted and uncrewed aircraft systems (UASs) into airspace utilized by traditional crewed aircraft is a current challenge for air navigation service providers (ANSPs) globally. The regulations and policies developed over decades of manned flight reflect the operational state where aircraft deconfliction, i.e., the detection and avoidance of collisions between aircraft, is currently a shared responsibility between the pilots onboard the aircraft and air traffic controllers, where each party complements the capabilities of the other to ensure safety of flight operations.

As remotely piloted and autonomous aircraft systems become ubiquitous, the relationship between the actors is altered. Remote pilots are removed from the aircraft, and may be only supervisory in their roles and in the case of fully autonomous aircraft, the human may play a limited or miniscule role in supervising the flight, only intervening in technical failures of the autonomy system. Further, under the current regulatory framework, the removal of the pilot from the aircraft confounds the requirement to meet the criteria under 14 CFR 91.113—Right of Way Rules—which outline responsibilities for aircraft operators in detecting and avoiding other aircraft.

As the airspace evolves to include a mix of remotely piloted, autonomous, and traditional crewed aircraft, air navigation service providers face significant integration challenges. Historical aviation regulations and policies, designed around human pilots and air traffic controllers collaboratively ensuring safety, must be reevaluated. In scenarios where pilots are either absent or merely supervisory due to increasing autonomy, the dynamics between these key safety actors change fundamentally. Emerging technologies aim to fill the role traditionally held by onboard pilots, necessitating a redefinition of the interactions between aircraft and air traffic control to maintain operational safety.

While others have proposed broad, notional systems to address collision avoidance in this new environment, for example, U.S. Pat. No. 9,417,325 to Bry et al., such systems are lacking in many respects. For example, the proposed solution of the '325 patent relies on a 3-D radar scan of the airspace. While 3-D radar systems technically exist, they are generally incapable of providing accurate radar and altitude data that could be validated for large scale use at higher altitudes with conventional aircraft, and are primarily developed for detection of small UAS. This along, with phased array radar, which is noted in the '325 patent, are not typical of FAA radar systems that are used in the Air Traffic Control network. Another considerable challenge that the '325 patent encounters is the establishment of third-party radar systems that detect non-cooperative targets, may not be validated by FAA and could be restricted by Department of Defense due to the potential for detection of national security sensitive flights. Such third-party radar systems would not be capable of discerning and filtering those sensitive flight details due to the nature of their design. Further, while the '325 patent addresses the potential for communication links between the control system and the uncrewed aircraft systems, it does not specify the formatting of the data for use across platforms and thus does not enable the ubiquitous usage of alert data.

The U.S. Army has developed a linked radar system for the U.S. Army Alaska (USARAK) UAS Ranges, currently used to enhance situational awareness across the Joint Pacific Multinational Readiness Capability (JPMRC). This system operates across Army Ranges at Joint Base Elmendorf-Richardson, Fort Wainwright, and the Fort Greely/Donnelley Training Area. It processes surveillance data from 10 feeds, including Short Range Radars (SRR), Long Range Radars (LRR), Multifunction Array Radar (MAR), and ADS-B, to enhance situational awareness at each Range Operations Center. Additionally, the system facilitates data sharing between the ranges through a circuitous redundancy, increasing reliability. However, the system is limited in scope, confined to military use within specific regions and does not address broader applications in civil aviation or autonomous flight operations.

Separately, the Air Force Research Laboratory (AFRL), in partnership with the State of Ohio Department of Transportation (ODOT) through its DriveOhio/Ohio Unmanned Aerial Systems Group, deployed the SkyVision Ground-Based Detect and Avoid (GBDAA) system at Springfield-Beckley Municipal Airport (KSGH). Designed to meet R&D requirements for unmanned aerial systems operating under Beyond Visual Line of Sight (BVLOS) in the National Airspace System (NAS), SkyVision connected with the FAA's Air Traffic Control (ATC) network but only gathered real-time data from three local radars: ASR-9 radars at Dayton International and Columbus International Airports, and the CARSAR long-range radar at London. These overlapping radar coverages ensured a high probability of detecting manned aircraft in the nearby unrestricted airspace. Although SkyVision proved useful for research, its operational scope was limited to defense-related testing within a 200-square-mile area, and it did not scale beyond its regional implementation.

Thus, as the rules of the interaction between air traffic controllers and pilots are fundamentally altered, new technologies, meant to supplement the role of the onboard pilot, must be developed.

SUMMARY OF THE INVENTION

The present invention is directed to a system and method that address these issues and provide solutions to the forementioned challenges. The invention integrates existing radar systems from the Federal Aviation Administration (FAA) and the Department of Defense (DOD) within a secure federal facility. This integration facilitates the provision of both raw and supplemental data to autonomous or remotely piloted aircraft. The system and method assist in conflict detection and provide alerts in a standardized format that can be used by the aircraft's operator while preserving the confidentiality of sensitive flight data.

The present invention details the specific connectivity to an actual validated radar system in a government facility that meets the criteria for a ground-based detect and alert system to facilitate compliance for 14 CFR 91.113 (Right-of-way rules) and other pertinent regulations. It addresses the security, both cyber and physical, of the systems that are required by the FAA national airspace system defense program office and the Department of Defense, a distinct improvement upon the prior art, making it more useful and realistically applicable to uncrewed aircraft systems operations in the national airspace under current federal regulations, policies, and procedures. The present invention also improves upon the '325 patent by addressing the connectivity to the government's extensible traffic management (XTM) concept through connectivity to Uncrewed Traffic Management to Service Suppliers (USS) and Providers of services to Urban air Mobility (PSU). It also significantly improves the functionality, realism, and potential applicability of the '325 patent, and therefore represents a meaningful step forward in the institution of a ground-based detect an alert system.

Although the present invention relies initially on the government radar surveillance network, it leaves the potential for inputs from third-party 3-D, phased array, and other data sources, which would be supplemental inputs to the FAA radar data and the present invention. Still further, FAA and DOD radar systems are capable of detecting cooperative Mode3S, and Automated Dependent Surveillance-Broadcast (ADS-B) as well as non-cooperative aircraft which are detected solely through reflected radar energy. Additionally, because the present invention is envisioned to be connected to the FAA national airspace system data feed, it could be used to discriminate from regular traffic, national security sensitive flights, with such information being removed from any alert data.

The present invention offers substantial advancements over both the U.S. Army's radar system and AFRL's SkyVision system by addressing critical limitations related to scalability, applicability, and functionality. Unlike the U.S. Army system, which is limited to specific UAS ranges, and SkyVision, which is confined to regional radar connections, the present invention is can support nation-wide operations. Its architecture enables seamless integration with virtually all FAA and DOD radars across the United States, allowing it to be utilized on a national scale for both military and civil aviation.

Furthermore, while both the U.S. Army system and SkyVision lack secure methods for anonymizing sensitive data, the present invention introduces a secure connectivity solution that ensures the protection of sensitive information. This capability makes it suitable for civil aviation applications, enabling the system to interface securely with FAA and DOD radars, thus expanding its use beyond defense-specific contexts. This secure connectivity feature ensures that sensitive data is protected across the entire radar network, a significant improvement over the prior systems, which are primarily focused on localized military operations without this level of data security.

In addition, the present invention introduces a standardized electronic alerting system, a feature absent in both the U.S. Army and SkyVision systems. Neither of those systems provide the capability to generate anonymized, standardized alerts that can be displayed or ingested by autonomous flight systems. The present invention's alerting system generates real-time, anonymized alerts in a standardized format, enabling integration with autonomous flight operations. This feature is essential for supporting autonomous UAS operations on a nation-wide scale, providing critical situational awareness and decision-making capabilities for unmanned systems.

The present invention thus distinguishes itself through innovations that are absent in both the U.S. Army and SkyVision systems, including secure connectivity for anonymizing sensitive data and a standardized electronic alerting system on a national scale. These advancements enable the invention to scale nation-wide, making it applicable to both military and civil aviation contexts, while also supporting the growing demand for autonomous flight operations. By addressing the limitations of the prior systems and integrating features essential for modern aviation, the present invention represents a significant step forward in enabling safe, secure, and scalable UAS and autonomous flight operations across the United States.

In accordance with a first exemplary embodiment, a system is provided for detecting potential collision conflicts involving uncrewed aircraft systems and for generating real-time alerts of such potential conflicts in a standardized format. The system includes a secured area having a unidirectional gateway and a back-end server (or cloud-based system), the back-end server receiving inputs from FAA/DOD radar systems relating to flight information for a plurality of aircraft via the unidirectional gateway. The unidirectional gateway prevents data from flowing back into the FAA systems. The front-end server is in two-way communication with the back-end server and uncrewed aircraft systems, and has a communication service to communicate with the uncrewed aircraft systems. The back-end server (i) analyzes the inputs from the FAA/DOD radar systems and the front-end server to determine trajectories of the plurality of aircraft and the uncrewed aircraft systems, (ii) analyzes the trajectories to determine potential collision conflicts involving the uncrewed aircraft systems, and (iii) provides alert information to the front-end server in the event of a potential collision conflict. Upon receiving the alert information from the back-end server, the front-end server communication service provides real-time alert information in a standardized format to any uncrewed aircraft system involved in the potential collision conflict.

Preferably, the back-end server removes sensitive information from the inputs from FAA/DOD radar systems before the alert information is provided to the front-end server. The back-end server also receives inputs from supplemental radar and sensors via the unidirectional gateway, in addition to the inputs from FAA/DOD radar systems, and the unidirectional gateway prevents the transmission of data from the FAA/DOD radar systems to the supplemental radar and sensors.

The system may also have a two-way communication path between the front-end server and flight autonomy systems, a two-way communications path between the front-end server and electronic flight bag systems, and a two-way communications path between the front-end server and FAA/NASA's Extensible Traffic Management system. The communication service may also provide the alert information to FAA/NASA's Extensible Traffic Management system and to a remote pilot in command/ground control station, in addition to the uncrewed aircraft system. The back-end server has the capability to receive inputs from FAA/DOD radar systems relating to nation-wide flight information.

In accordance with preferred embodiments, the unidirectional gateway is comprised of a data diode, and the back-end server provides alert information only concerning aircraft that would be projected to penetrate a sphere or other defined area around the aircraft.

In accordance with a second exemplary embodiment, a method for detecting potential collision conflicts involving uncrewed aircraft systems and for generating real-time alerts of such potential conflicts in a standardized format, comprises receiving, at a back-end server in secured area via a unidirectional gateway, inputs from FAA/DOD radar systems relating to flight information for a plurality of aircraft, preventing, at the unidirectional gateway, data from flowing back into the FAA systems, providing a front-end server in two-way communication with the back-end server and uncrewed aircraft systems, providing, in the front-end server, a communication service to communicate with the uncrewed aircraft systems, analyzing, at the back-end server, the inputs from the FAA/DOD radar systems and the front-end server to determine trajectories of the plurality of aircraft and the uncrewed aircraft systems, analyzing, at the back-end server, the trajectories to determine potential collision conflicts involving the uncrewed aircraft systems, providing real-time alert information in a standardized format from the back-end server to the front-end server in the event of a potential collision conflict, and providing the alert information from the front-end server communication service to any uncrewed aircraft system involved in the potential collision conflict.

The method preferably includes removing, at the back-end server, sensitive information from the inputs from FAA/DOD radar systems before the alert information is provided to the front-end server. The method may further include receiving, at the back-end server, inputs from supplemental radar and sensors via the unidirectional gateway, in addition to the inputs from FAA/DOD radar systems, and preventing, at the unidirectional gateway, the transmission of data from the FAA/DOD radar systems to the supplemental radar and sensors. The method may also remove sensitive information from the supplemental radar systems and sensors.

The method may further establish a two-way communication path between the front-end server and flight autonomy systems, a two-way communications path between the front-end server and electronic flight bag systems, and a two-way communications path between the front-end server and FAA/NASA's Extensible Traffic Management system. The method may further provide the alert information to FAA/NASA's Extensible Traffic Management system and to a remote pilot in command/ground control station, in addition to the uncrewed aircraft system. The back-end server has the capability to receive inputs from FAA/DOD radar systems relating to nation-wide flight information.

In accordance with preferred embodiments of the method of the present invention, the unidirectional gateway is comprised of a data diode, and the back-end server provides alert information only concerning aircraft that would be projected to penetrate a sphere or other defined area around the aircraft.

BRIEF DESCRIPTION OF THE DRAWINGS

These and other objects and aspects of the present invention will be described with reference to the following drawing figures, of which.

DETAILED DESCRIPTION

Figure 1:
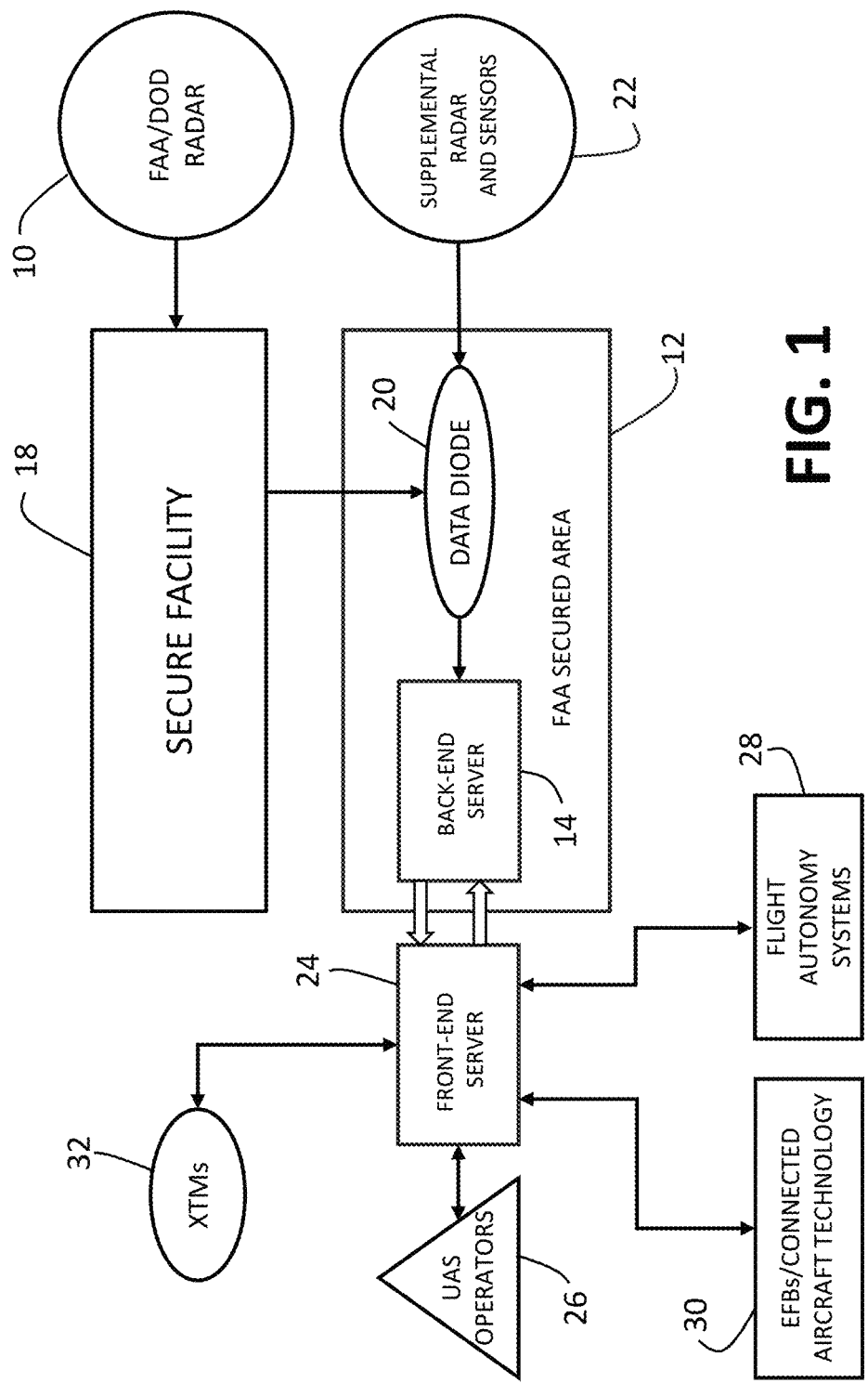
FIG. 1 is a diagram illustrating an example of a system in accordance with the present invention.

With reference to the figures, the present invention utilizes existing FAA and DOD radar systems 10 through a unique, secure architecture, to thereby transmit relevant, filtered, real-time surveillance information to remote pilots and automation systems, beyond the limits of passive surveillance and on-board detection capabilities, in a standardized, anonymized format. The FAA/DOD radar systems provide the capability to provide nation-wide surveillance. The present invention taps into the central aggregated data hub for all the FAA/DOD radars. It utilizes these radar systems through secure connectivity located within a secured area 12 to provide raw and supplemental data, to provide conflict detection and alerts to aircraft using a standardized data format that may be processed and utilized by the responsible operator of the aircraft while protecting the anonymity of sensitive flight information and other data.

While the presentation of the air traffic controller's radar, or the use of passive detection technologies such as transponders, to the remote pilot or onboard detection systems could hypothetically be an adequate surrogate for the active roles of the pilot and controller, there are restrictions on the transmission of such data levied by the U.S. Department of Defense and the Federal Aviation Administration. Further, passive systems cannot detect non-broadcasting aircraft. Additionally, active systems, such as on-board radar located on uncrewed aircraft, do not provide adequate range and/or fidelity to be the detection solution at relatively high rates of closure or in certain environmental conditions.

The present invention provides solutions to aid with traffic deconfliction, addressing a critical emerging capability gap, while maintaining the safekeeping of national security-related flight information, akin to existing air traffic control systems.

The use of certified FAA radars provides a tried and tested method of aircraft detection, and when supplemented by passive systems (e.g. Mode 3/S transponder and Automatic Dependent Surveillance Broadcast (ADS-B)), the result is a robust air surveillance awareness that is built on decades of engineering and validation. However, as noted, providing this combined surveillance information to the public is restricted by FAA and DOD policies and in that context, the present invention secures, processes and presents only the anonymized, relevant information to the aircraft operator via a standardized protocol that may be transmitted through various connectivity paths to the appropriate end users.

The present invention secures sensitive data through physical and cyber security methods to meet the stringent data requirements levied by the FAA's National Airspace System Defense Programs (NDP) division. It uses a back-end server 14 residing in secured area 12 with connectivity to the FAA's internal data systems in a secure facility 18 such as the William J. Hughes Technical Center (WJHTC) in New Jersey. The WJHTC is a focal point for the FAA's NextGen Prototyping Network (NPN) which is an information backbone that connects the FAA research and development network with certain outside entities and provides permissioned access to much of the data from FAA systems in the National Airspace System as well as its research laboratories. These radar feeds are part of the United States Joint Surveillance System in which virtually all federal air surveillance radars flow data through a consolidated FAA system. Additionally, other supplemental surveillance inputs 22, such as Mode 3/S transponders and ADS-B, and third-party systems, such as a non-FAA radar source, or other own-ship positions provided by an Extensible Traffic Management system (XTM) data provider or via connection from the aircraft or ground control station (GCS) to the front-end server, may be made available to server 14 to improve detection capabilities.

The architecture of the present invention provides a layer of physical security for the back-end server 14 where the sensitive data will be processed and stored. Data from facility 18, and any supplemental surveillance inputs 22, are transmitted, one way, to the back-end server 14 via a unidirectional gateway provided by a data diode 20, such as the SureSentry™ Data Diode made by Sunhillo Corporation of West Berlin, New Jersey, thus preventing backflow of data into FAA systems or elsewhere. This arrangement provides the initial cyber secure buffer between the FAA network and supplemental sources, on the one hand, and the system according to the present invention, on the other.

The back-end server 14 contains routines and databases required to perform radar processing, conflict detection, and alert data packaging as well as any other needed capabilities to assist aircraft deconfliction, so that affected aircraft can take appropriate avoidance measures. Additionally, the server 14 may also optionally develop trajectory solutions and provide them to affected aircraft, although specific avoidance measures may be left to the affected aircraft, after a potential conflict is detected by the present invention and transmitted to such aircraft. Detection routines that project trajectories from radar track and supplemental data and determine potential aircraft conflicts reside on the back-end server 14. In the event of a potential conflict, the server creates the information to be included in an alert to be transmitted to the operators of the conflicted aircraft. The detection routines may be open-source, such as Richard Alligier, Nicolas Durand, Gregory Alligier, "Efficient Conflict Detection for Conflict Resolution," ICRAT2018, 8th International Conference on Research in Air Transportation, June 2018, Castelldefels, Spain. hal-01859904, standardized for all users, or proprietary to an end-user of the system based upon the end-user's operational needs.

If the back-end server 14 detects a conflict, it provides the conflict alert data in the determined format to a "command center" front-end server 24, which communicates with the affected aircraft operators as will be described. The back-end server anonymizes/redacts alert data to prevent dissemination of national security or other sensitive information. As noted, the alert data may include possible trajectory solutions or other information that assists the responsible operator of the affected aircraft in avoiding the detected target.

Back-end server 14 is connected to front-end server 24 in a cyber-secure manner through a robust cybersecurity layer such as CMMC 2.0, Level 2. The front-end server receives customer aircraft position information through various sources, described below, and queries the back-end server for detection and deconfliction by providing aircraft position and other relevant data for the back-end server to analyze. Front-end server 24 communicates with remote aircraft systems operators 26 and other external systems and users such as flight autonomy systems 28 (for example, those being developed by the Department of Defense and numerous UAS companies, including retrofit systems for existing airframes (e.g. C208 Caravan)), "electronic flight bag" systems (EFBs) and connected aircraft technology 30 (such as the Jeppesen Flight Deck Pro), which allow communications between manned aircraft and the server 24, and at block 32, FAA/NASA's Extensible Traffic Management system (XTM) and associated future service suppliers (e.g. Uncrewed Traffic Management Service Supplier (USS) and Providers of Services to UAM's (PSU)). The front-end server in turn provides data and queries to back-end server 14 regarding the reference location of subject aircraft to be deconflicted. Back-end server 14 analyzes this data, and the data from FAA/DOD radar 10 and supplemental sources 22 (e.g. ADS-B, own-ship location technologies, GPS, and others) to detect potential conflicts. In the case of a self-reporting aircraft (e.g. ADS-B or Mode 3/S), the back-end server will typically have the location through radar data. The interface between the front and back-end servers may allow for other relevant information to flow to the back-end server to provide further context to the deconfliction requirements.

The interface between front-end server 24 and UAS operators 26 preferably consists of connectivity that allows for a geographically distributed user base, utilizing existing internet protocol technologies and may include some security features (e.g. VPN). Preferably, standardized data formats (e.g. XML, JSON, etc.) and potentially a standards body recommended exchange protocol (e.g. FIXM) can be used to enable a graphical or textual display of standardized alerting information and/or to allow for on-board detection and avoidance technologies. The pilot or flight management system can use this information to determine the appropriate trajectory of the aircraft to deconflict with any traffic. As noted, the present invention could also optionally derive a trajectory solution for the aircraft and provide that data to the pilot or flight management system. This trajectory solution would be processed on back-end server 14 in conjunction with the collision detection routines executed on that server. Alternatively, the information could be utilized by any aircraft or pilot utilizing flight deck situational awareness technology (e.g. Electronic Flight Bag (EFB) or similar) to establish a trajectory solution, which are widely available and may connect via IP Datalink over existing networks.

The information transmitted from front-end server 24 to the end-users would include reference to the position, trajectory, speed, altitude (if available) and other relevant data that would assist in the deconfliction of the aircraft. These alerts would not include any identifying information about a target that could be considered sensitive, such as, for example, callsigns, tail numbers, aircraft types and other similar information. The alert data may be presented in a variety of formats to the user, such as textual, graphical or other depiction to be determined by the display interface or flight system, or developed within international standards organizations (e.g. ASTM) and adopted by air navigation service providers (ANSPs) (e.g. the FAA) and aviation technology.

In preferred embodiments, and in furtherance of the goal to protect sensitive information, the system will preferably provide alerts only concerning targets that would be projected to penetrate a sphere or other defined area around the "protected" aircraft, which will reduce the overall data release to only a small set of relevant tracked targets. Other filtering mechanisms may be applied to further constrain data flow, as will be appreciated.

The capabilities of the present invention can support future instantiations of extensible traffic management (XTM) by providing filtered flight location data to the third-party, federated network of entities (e.g., PSU—Provider of Services to UAM or USS—Uncrewed Traffic Management (UTM) Service Supplier) that support collaborative flight operations. The present invention may be considered a "supplementary data service provider" (SDSP) under notional XTM service architectures developed by the government.

Figure 2:
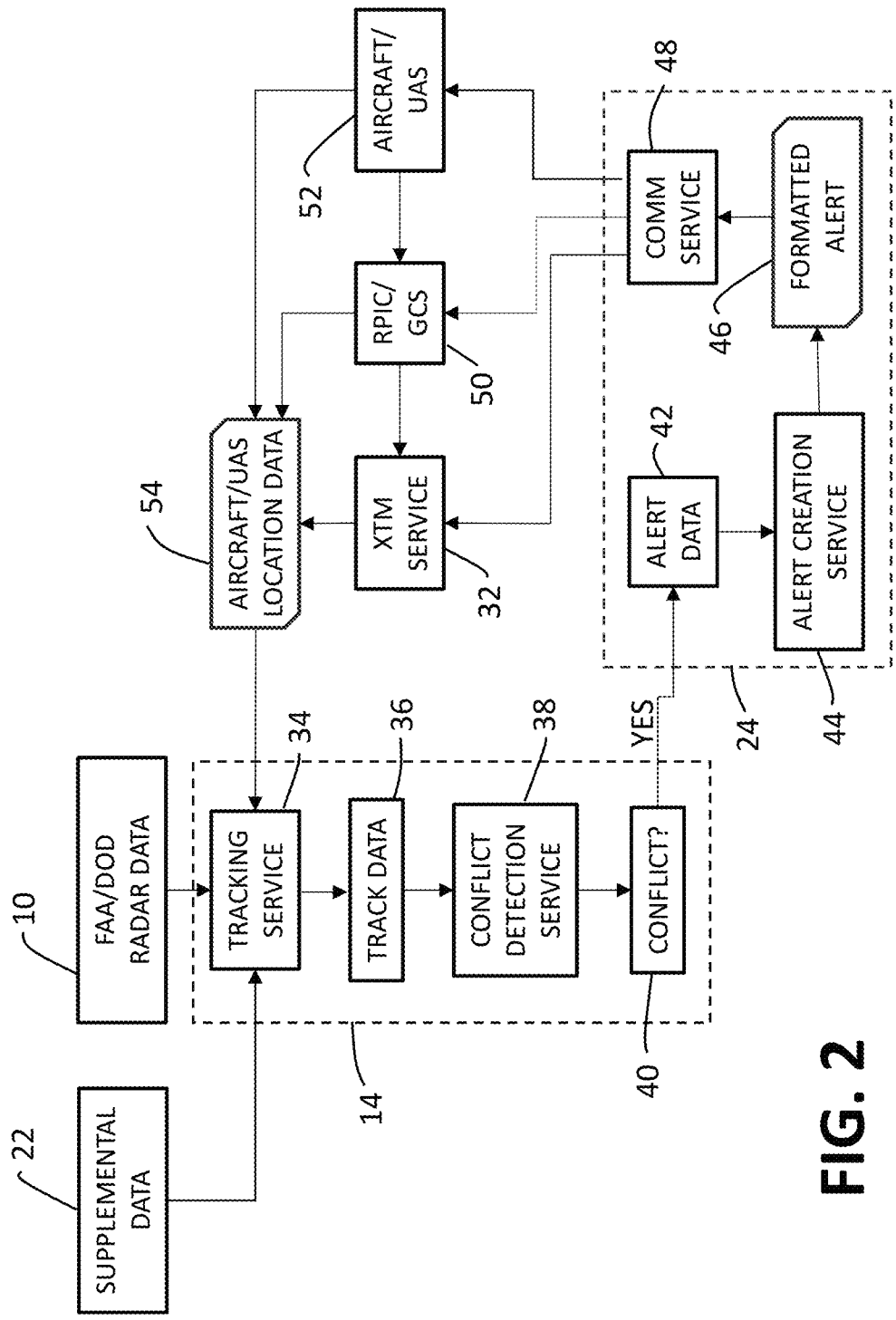
FIG. 2 is an illustration of an example of the information flow as implemented by the present invention.

Additional functionality of the present invention will be described with reference to FIG. 2. Back-end server 14 receives FAA/DOD radar data 10 and data from supplemental third-party surveillance inputs 22 (facility 18 and data diode 20 not shown in the figure). Functionally, server 14 includes (i) tracking service 34, which receives, fuses and processes the relevant radar and supplemental data, (ii) track data 36, i.e., the radar and supplemental data as fused together, which contains the track outputs, and (iii) conflict detection service 38, which analyzes the output track data, determines trajectories (or aircraft vectors) based on all track data, and compares the trajectories with the known position and trajectory of the subject aircraft, to detect potential conflicts in accordance with available, well-known or proprietary detection routines.

Block 40 functions to determine potential conflicts, as discussed above. As noted, to protect sensitive information, the system will preferably provide alerts for conflicts only concerning targets that would be projected to penetrate a sphere or other defined area around the "protected" aircraft, which will reduce the overall data release to only a small set of relevant tracked targets.

If a potential conflict is detected within the protected sphere or other defined area at 40, sensitive information regarding the affected aircraft, such as, for example, callsigns, tail numbers, aircraft types, is removed to form anonymized alert data at block 42. This alert data will typically be comprised of location, trajectory (direction, speed, altitude if available), expected time to intercept or penetration of protected area, a trajectory solution if such is provided, and any other, non-sensitive, relevant data. The alert data will be transmitted to alert creation service at block 44, and formatted in a standardized format at 46. The alert is then delivered to communication service 48 which transmits the alert, in real-time, using, for example, an appropriate internet protocol, to XTM service 32, remote pilot in command/ground control station (RPIC/GCS) 50, which may provide command and control or human oversight of the aircraft, and autonomous aircraft and UAS operators (the party responsible for the aircraft) at block 52. For a manned aircraft, the EFB 30, FIG. 1, would reside in the cockpit; for a RPIC, the EFB 30 would be at the ground station that supervises the UAS.

Upon receiving an alert, the XTM service 32, RPIC/GCS 50 and/or aircraft/UAS operators 52 will take appropriate steps to avoid any potential collisions by employing well-known collision avoidance algorithms, manual control, or by using avoidance trajectory data if such is provided by the backend server. Whether or not a potential conflict exists, however, XTM service 32, RPIC/GCS 50 and aircraft/UAS operators 52 may provide aircraft/UAS location data 54 back to the tracking service 34 in the back-end receiver 14, which in turn, continues to track potential conflicts in a continuous loop. Location data from aircraft/UAS 52 is generally provided to RPIC/GCS 50 via telemetry link, which in turn may provide location data to XTM service 32 thereby delivering aircraft location to the tracking service. In cases where the aircraft or GCS is connected to the front-end server via some communications path outside of the XTM service, location data may be provided directly.

Thus, by integrating existing FAA and DOD radar systems, the present invention ensures, real-time potential conflict detection, and provides alerts in a standardized, anonymized format that can be used by the aircraft's operator while preserving the confidentiality of sensitive flight data. While the foregoing is directed to exemplary embodiments of the present invention, other and further embodiments of the invention may be devised without departing from the spirit and scope thereof, as defined in the following claims.

I claim:

1. A system for detecting potential collision conflicts involving uncrewed aircraft systems and for generating real-time alerts of such potential conflicts in a standardized format, comprising:
    a secured area having a unidirectional gateway and a back-end server, said back-end server receiving inputs from FAA/DOD radar systems relating to flight information for a plurality of aircraft via said unidirectional gateway, said unidirectional gateway preventing data from flowing back into said FAA systems;
    a front-end server in two-way communication with said back-end server and uncrewed aircraft systems, said front-end server having a communication service to communicate with said uncrewed aircraft systems;
    whereby said back-end server (i) analyzes said inputs from said FAA/DOD radar systems and said front-end server to determine trajectories of said plurality of aircraft and said uncrewed aircraft systems, (ii) analyzes said trajectories to determine potential collision conflicts involving said uncrewed aircraft systems, and (iii) provides alert information to said front-end server in the event of a potential collision conflict; and
    upon receiving said alert information from said back-end server, said front-end server communication service provides said real-time alert information in a standardized format to any uncrewed aircraft system involved in said potential collision conflict.

2. The system of claim 1, wherein said back-end server removes sensitive information from said inputs from FAA/DOD radar systems before said alert information is provided to said front-end server.

3. The system of claim 2 wherein said back-end server receives inputs from supplemental radar and sensors via said unidirectional gateway, in addition to said inputs from FAA/DOD radar systems, and said unidirectional gateway prevents the transmission of data from said FAA/DOD radar systems to said supplemental radar and sensors.

4. The system of claim 2 further comprising a two-way communication path between said front-end server and flight autonomy systems.

5. The system of claim 2 further comprising a two-way communications path between said front-end server and electronic flight bag systems.

6. The system of claim 2 further comprising a two-way communications path between said front-end server and FAA/NASA's Extensible Traffic Management system.

7. The system of claim 2 wherein said communication service provides said alert information to FAA/NASA's Extensible Traffic Management system and to a remote pilot in command/ground control station, in addition to said uncrewed aircraft system.

8. The system of claim 2 wherein said unidirectional gateway is comprised of a data diode.

9. The system of claim 2 wherein said back-end server provides alert information only concerning aircraft that would be projected to penetrate a defined area around said aircraft.

10. The system of claim 2 wherein said back-end server receives inputs from FAA/DOD radar systems relating to nation-wide flight information.

11. A method for detecting potential collision conflicts involving uncrewed aircraft systems and for generating real-time alerts of such potential conflicts in a standardized format, comprising:
    receiving, at a back-end server in secured area via a unidirectional gateway, inputs from FAA/DOD radar systems relating to flight information for a plurality of aircraft;
    preventing, at said unidirectional gateway, data from flowing back into said FAA systems;
    providing a front-end server in two-way communication with said back-end server and uncrewed aircraft systems;
    providing, in said front-end server, a communication service to communicate with said uncrewed aircraft systems;
    analyzing, at said back-end server, said inputs from said FAA/DOD radar systems and said front-end server to determine trajectories of said plurality of aircraft and said uncrewed aircraft systems;

analyzing, at said back-end server, said trajectories to determine potential collision conflicts involving said uncrewed aircraft systems;

providing real-time alert information in a standardized format from said back-end server to said front-end server in the event of a potential collision conflict; and providing said alert information from said front-end server communication service to any uncrewed aircraft system involved in said potential collision conflict.

12. The method of claim 11 further comprising removing, at said back-end server, sensitive information from said inputs from FAA/DOD radar systems and supplementary systems before said alert information is provided to said front-end server.

13. The method of claim 12 further comprising receiving, at said back-end server, inputs from supplemental radar and sensors via said unidirectional gateway, in addition to said inputs from FAA/DOD radar systems, and preventing, at said unidirectional gateway, the transmission of data from said FAA/DOD radar systems to said supplemental radar and sensors.

14. The method of claim 12 further comprising establishing a two-way communication path between said front-end server and flight autonomy systems.

15. The method of claim 12 further comprising establishing a two-way communications path between said front-end server and electronic flight bag systems.

16. The method of claim 12 further comprising establishing a two-way communications path between said front-end server and FAA/NASA's Extensible Traffic Management system.

17. The method of claim 12 wherein said communication service provides said alert information to FAA/NASA's Extensible Traffic Management system and to a remote pilot in command/ground control station, in addition to said uncrewed aircraft system.

18. The method of claim 12 wherein said unidirectional gateway is comprised of a data diode.

19. The method of claim 12 wherein said back-end server provides alert information only concerning aircraft that would be projected to penetrate a defined area around said aircraft.

20. The method of claim 12 wherein said back-end server receives inputs from FAA/DOD radar systems relating to nation-wide flight information.

\* \* \* \* \*